United States Patent
Sigg et al.

(10) Patent No.: US 8,625,537 B1
(45) Date of Patent: *Jan. 7, 2014

(54) CONTROLLING MOBILE-DEVICE ROAMING

(71) Applicant: Sprint Communications Company L.P., Overland Park, KS (US)

(72) Inventors: Jason Peter Sigg, Olathe, KS (US); Anoop Kumar Goyal, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/776,510

(22) Filed: Feb. 25, 2013

Related U.S. Application Data

(63) Continuation of application No. 13/464,054, filed on May 4, 2012, now Pat. No. 8,411,643, which is a continuation of application No. 12/400,914, filed on Mar. 10, 2009, now Pat. No. 8,228,870.

(51) Int. Cl.
*H04W 4/00* (2009.01)

(52) U.S. Cl.
USPC ............................ 370/331; 455/432.1; 726/3

(58) Field of Classification Search
None
See application file for complete search history.

(56) References Cited

U.S. PATENT DOCUMENTS

| | | | |
|---|---|---|---|
| 5,408,419 A * | 4/1995 | Wong | 709/225 |
| 6,091,717 A * | 7/2000 | Honkasalo et al. | 370/329 |
| 6,463,286 B1 * | 10/2002 | Salminen | 455/453 |
| 6,950,650 B2 * | 9/2005 | Roeder | 455/417 |
| 7,299,005 B1 * | 11/2007 | Yarkosky et al. | 455/7 |
| 7,333,808 B2 * | 2/2008 | Elkarat et al. | 455/432.1 |
| 7,937,083 B2 * | 5/2011 | Oommen | 455/432.3 |
| 2002/0107017 A1 * | 8/2002 | Song | 455/432 |

\* cited by examiner

*Primary Examiner* — Alex Skripnikov

(57) ABSTRACT

Media and systems for controlling roaming of a mobile device on a wireless-communications network are described. Wireless-communications systems along a coverage area border are designated as roaming border systems. A parameter value is communicated from wireless-communications systems of a home network to a mobile device. The parameter takes on a value indicating whether a mobile device is permitted to initiate a connection to a roaming network. A mobile device is restricted to use of home-network systems when a first parameter value is received. The mobile device is permitted to use home-network and roaming-network systems when a second parameter value is received. Thus, the mobile device can only roam when the second parameter value has been communicated thereto.

18 Claims, 8 Drawing Sheets

CONTROLLING MOBILE-DEVICE ROAMING

CROSS-REFERENCE TO RELATED APPLICATIONS

This application is a continuation of and claims the benefit of U.S. application Ser. No. 13/464,054, filed May 4, 2012, entitled "Controlling Mobile-Device Roaming," which is a continuation of U.S. application Ser. No. 12/400,914, filed Mar. 10, 2009 and issued Jul. 24, 2012 as U.S. Pat. No. 8,228,870, entitled "Controlling Mobile-Device Roaming, all of which are entirely incorporated herein by reference.

BACKGROUND

Roaming occurs in a wireless network when a mobile device, such as a wireless phone, personal digital assistant (PDA), or other mobile device connects to a network other than its home network. Many wireless-networks providers have contracted with each other to allow its customers to use the services of a second network for a fee (though often transparent and unbeknownst to the mobile subscriber). By such agreements, the wireless-network providers pay each other for their subscribers' usage of other wireless networks.

By negotiating agreements with other wireless-networks providers, a given provider is able to offer continuity of service over a larger area without having to build out its own wireless network. But nevertheless, for a variety of reasons, a home carrier often would like for its users to use its network.

SUMMARY

Embodiments of the invention generally relate to computer-readable media and systems to control roaming of a mobile device that is configured to communicate with a home network. A parameter value is communicated from a wireless-network communications system of a home network, such as a cell sector, tower, or base station to a mobile device, such as a wireless phone and is stored therein. The parameter value identifies whether the system is a roaming border system. Roaming of the mobile device is thereby controlled by restricting the mobile device to use of a home network system when the parameter value indicates that the wireless-communications network system from which the device received the parameter value is not a roaming border system. The mobile device is enabled to connect to a wireless-communications network system of a roaming network when the parameter value indicates a roaming border system. A prioritized list of authorized wireless-communications network systems that the mobile device is authorized to use may also be provided to further control the mobile device's roaming when such is enabled.

This Summary was provided to introduce a selection of concepts in a simplified form that are further described below in the Detailed Description. This Summary is not intended to identify key features or essential features of the claimed subject matter, nor is it intended to be used in isolation as an aid in determining the scope of the claimed subject matter.

BRIEF DESCRIPTION OF THE DRAWING

Illustrative embodiments of the invention are described in detail below with reference to the attached drawing figures, wherein.

DETAILED DESCRIPTION

Figure 1:
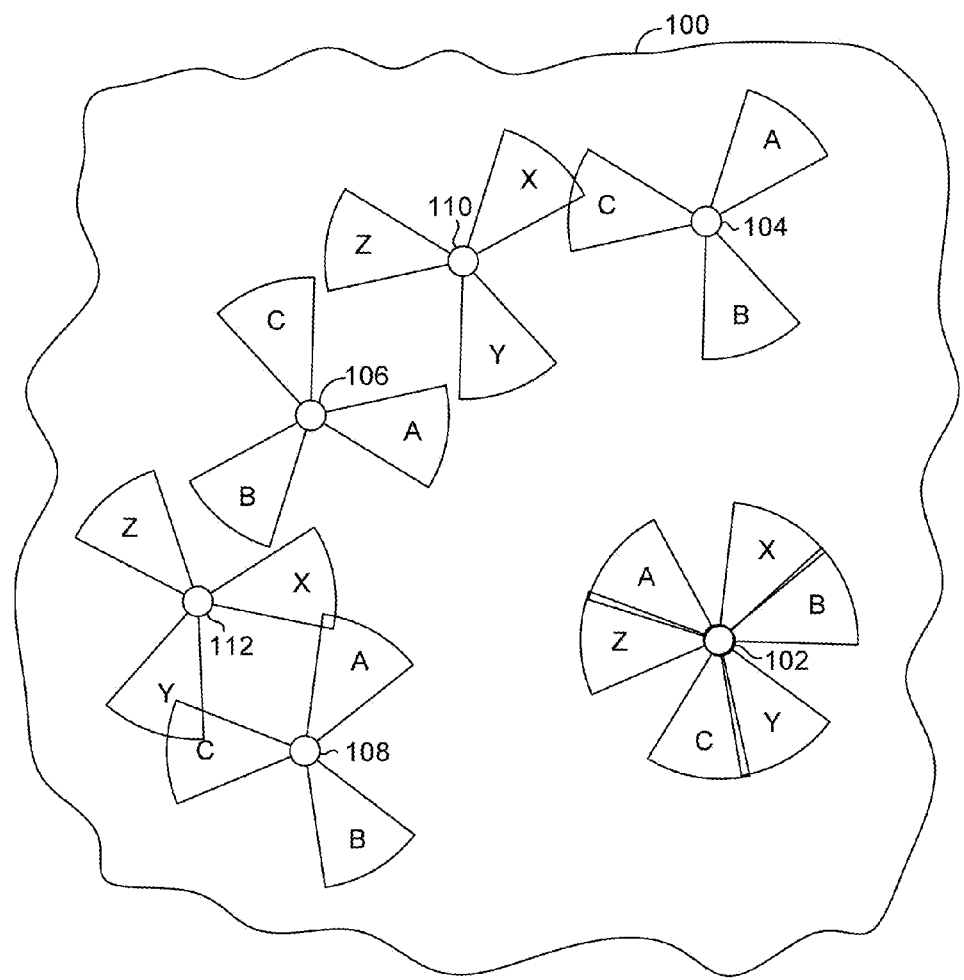
FIG. 1 is an illustration of a wireless-network environment suitable for use in implementing embodiments of the invention.

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

PDA Personal Data Assistant
SMS Short Message Service
MMS Multimedia Messaging Service
GSM Global System for Mobile communications
UMTS Universal Mobile Telecommunications System
PCS Personal Communication Service
UMB Ultra Mobile Broadband
RF Radio Frequency
SID System Identification
NID Network Identification Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and non-removable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, random-access memory (RAM), read-only memory (ROM), electrically erasable programmable read-only memory (EEPROM), flash memory or other memory technology, compact disc read-only memory (CD-ROM), digital versatile discs (DVD), holographic media or other optical disc storage, magnetic cassettes, magnetic tape, magnetic disk storage, and other magnetic storage devices. These technologies can store data momentarily, temporarily, or permanently.

Embodiments of the invention provide computer-implemented systems and computer-readable media for performing a method to control roaming of a mobile device that is configured to communicate with a home network. In one embodiment, computer-readable media having computer-executable instructions embodied thereon that, when executed, enable a wireless-telecommunications network to perform a method of controlling a way that a mobile device selectively initiates communications with one of a home network versus a second network is described. Roaming-border components providing signal coverage that collectively defines the border of the home network are utilized. A parameter is communicated to a mobile device from a given roaming-border component. The parameter takes on a value that indicates that the mobile device is permitted to roam to the second network such that absent receiving the value, the mobile device is not allowed to roam to the second network.

In another embodiment, a system for controlling a way that a mobile device selectively initiates communications with one of a home network versus a second network is described. The system includes a parameter-receiving component, a system-identifying component, and a connection-enabling component. The parameter-receiving component is configured to receive a parameter value from a home-network system. The parameter takes on a first value that indicates that the mobile device is not permitted to roam on the second network, or a second value that indicates that the mobile device is permitted to roam on the second network. The system-identifying component is configured to receive identification data communicated from the home network and the second network. The system-identifying component is also configured to compare the received identification data to known identification data to identify the communicating system. The connection-enabling component is configured to prevent communicating with the second network when the first parameter value is received and to enable communicating with the second network when the second parameter value is received.

In another embodiment, computer-readable media, having computer-executable instructions embodied thereon that, when executed, enable a wireless telecommunications network to perform a method of controlling a way that a mobile device selectively initiates communications with one of a home network versus a second network is described. A preferred roaming list is provided including a prioritized list of, on a home network, non-roaming border cell sectors and roaming-border cell sectors, and cell sectors on second networks that a mobile device is authorized to utilize. The non-roaming border cell sectors are utilized to communicate a first parameter value in a first system-parameters message to the mobile device. The first parameter value indicates that the mobile device is not permitted to initiate a connection with the second network cell sectors. The roaming-border cell sectors are utilized to communicate a second parameter value in a second system-parameters message to the mobile device. The second parameter value indicates that the mobile device is permitted to initiate a connection with the second network cell sectors, whereby the mobile device is enabled to selectively initiate a connection based on the preferred roaming list.

Roaming occurs when a user subscribed to a home network connects to a network other than the home network, hereinafter referred to as a roaming network or second network. A home network, as referred to herein, is descriptive of a wireless-telecommunications, wireless-communications network, or more simply a network to which a user is subscribed for wireless-communications service and is not intended to imply any relation to a user's home or dwelling. The terms wireless-telecommunications and wireless-communications are used interchangeably hereinafter.

Wireless-network providers generally wish to limit or decrease the amount of roaming that subscribers incur, because the provider does not want to pay another provider for usage of the other's network. This is especially true where roaming occurs within an area in which the provider has attempted to make service available. A user having a subscription to a home network may roam when, for example and not limitation, the user's mobile device cannot find a home-network signal, a home-network signal is weak or intermittent, or the user's mobile device does not properly search for a home-network signal. A home-network signal might be weak or not found even within a service area of a home-network antenna where for example, a structure, building, or feature of the landscape blocks the signal. Additionally, other signals or energies may interfere with the signal, or the number of connections being serviced by an antenna may decrease the size of an antenna's service area, among others.

A mobile device, such as that described above, may be any wireless phone, cellular phone, personal digital assistant (PDA), BlackBerry® device, wireless enabled media player, or other device configured to communicate over a wireless network. Such communication may be voice, data, image, video, or other type of data and may utilize services and protocols to enable short message service (SMS), text messaging, email, packet switching for Internet access, and multimedia messaging service (MMS), among others.

A wireless network may comprise any wireless-communications network configured to transmit and receive wireless signals to one or more mobile devices. Communications over the wireless network may be completed by any available standards or protocols including Global System for Mobile communications (GSM), Universal Mobile Telecommunications System (UMTS) Third Generation (3G), Personal Communications Service (PCS), or Ultra Mobile Broadband (UMB), among others.

Further, the wireless network antenna may communicate to mobile devices in any available manner, such as for example simplex (or half-duplex) mode in which the communications travel both from the mobile device to an antenna or from the antenna to the mobile device, but only in one direction at a time. The communications may also utilize full-duplex mode in which communication travels in both directions at one time over one or more channels.

With reference initially to FIG. 1, a wireless-network environment 100 suitable for use in implementations of embodiments of the invention is described. The wireless-network environment 100 may comprise any geographic area in which wireless-network communications are provided. The environment 100 includes a plurality of home-network towers 102, 104, 106, and 108 as well as a plurality of roaming-network towers 102, 110 and 112. A home-network tower 102, 104, 106, and 108 comprises a tower having one or more wireless network antennas mounted thereon, but may also comprise any location at which a wireless network antenna for a home network is located. Such locations may include buildings, skyscrapers, bridges, church steeples, mountains, and hillsides, among other structures on which an antenna may be mounted. Similarly, a roaming-network tower 102, 110, and 112 comprises a tower having one or more roaming-network antennas mounted thereon, but may also comprise any other structure described above for home-network towers 102-108. Additionally, as depicted by home-network tower 102 and roaming-network tower 102, antennas for more than one network can be mounted on a single tower or at a single location.

Each home-network tower 102-108 has three antennas mounted thereon that each designate a sector A, B, or C about the tower. Each roaming-network tower 102, 110-112 also has three antennas mounted thereon that each designate a sector X, Y, or Z. In embodiments, a home-network tower or a roaming-network tower may have more or fewer than three antennas mounted thereon. The antennas comprise transmitters, receivers, transceivers, or any other available antenna technology for transmitting and receiving radio frequency (RF) signals or any other signal employable in a wireless network. The antennas, and any corresponding subsystems, may operate on single or multiple channels, may be trunked, multiplexed, or utilize any available systems, protocols, or logic necessary for providing wireless network communications.

Figure 2:
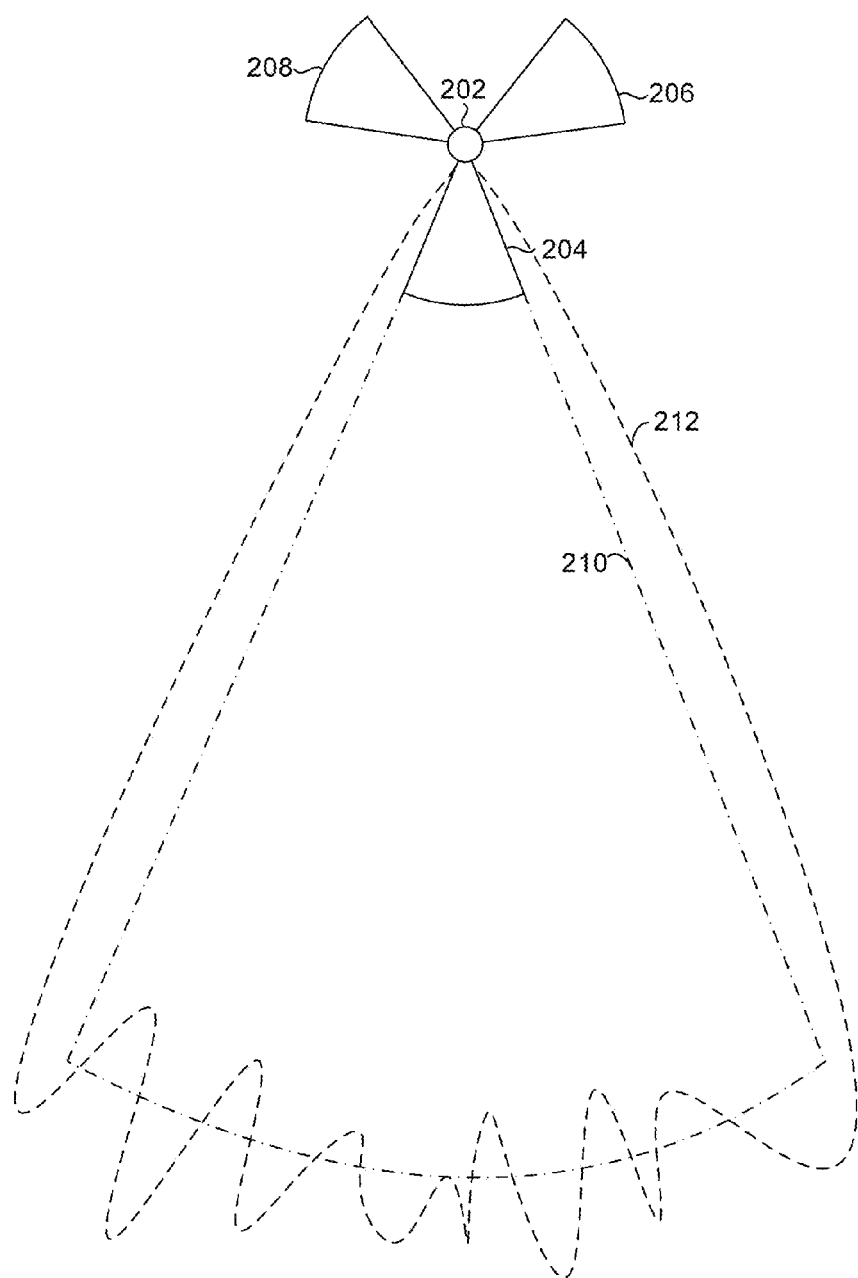
FIG. 2 is an illustration of a wireless-network communications tower depicting a service area of an antenna according to an embodiment of the invention.

With additional reference to FIG. 2, illustrating a wireless network communications tower 202, sectors 204, 206, and 208, each generally depict the direction in which a corresponding antenna is aimed. The mounting of the antennas on the tower 202 and RF shielding around the antennas can be used to aim and adjust the size and location of an area served by an antenna, among other methods. The service area 210 of an antenna may be viewed generally as extending radially outward from the pie shaped wedge depicting the sector 204. In practice, the RF energy from the antenna 102 extends in a more ambiguous form, as generally depicted by a service area 212, and may change, grow, or retract as more or fewer callers connect thereto.

Figure 3A:
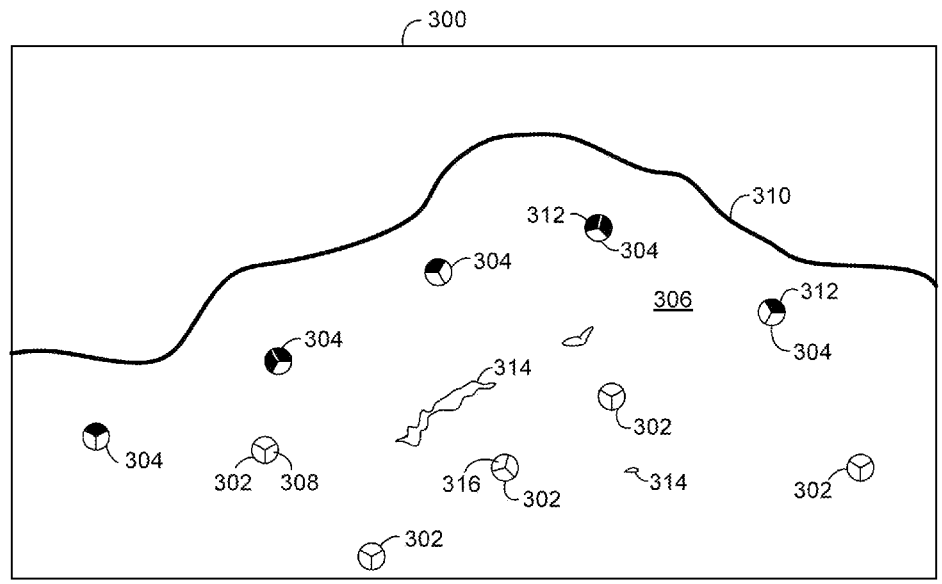
FIG. 3A is a graphical representation of a map depicting a home-network coverage area of a wireless-network communications system according to an embodiment of the invention.

With reference now to FIG. 3A, a graphical representation of a map 300 depicting a home-network coverage area of a wireless-network communications system is described in accordance with an embodiment of the invention. The home-network coverage area map 300 indicates the location of a plurality of home-network cell sites 302 and 304 within a home-network coverage area 306. The home-network cell sites 302 and 304 each utilize three antennas, as described above. Each antenna designates a cell sector 308 which is depicted in the home-network coverage area map 300 by a pie shaped wedge at each home-network cell site 302 and 304. The service area of each antenna or cell sector 308 may generally be described as extending radially outward in the direction and shape of the pie shaped wedge by which it is depicted. As described above with respect to FIG. 2, in practice the shape of the service area may not be identical to that indicated by the pie shape, but such will be assumed here for sake of clarity and illustration. The home-network cell sites 302 and 304 are differentiated only by their location in proximity to a home-network coverage area border 310. The home-network cell sites 302 are located interior to the home-network coverage area 306 while the home-network cell sites 304 are located along the home-network coverage area border 310.

The home-network coverage area border 310 generally indicates the outermost edge of a geographic area in which wireless communications of the home network are available under standard conditions and using a standard mobile device. The home-network coverage area border 310 is depicted by a solid line in FIG. 3A, but might be more aptly described as being grey or fuzzy, because in practice the line may expand or retract with changing conditions in the environment and usage of the home network's systems.

One or more cell sectors 308 at the cell sites 304 are designated as roaming border sectors 312. A roaming border sector 312 is a cell sector 308 that has a service area (such as the service area 210 or 212 as shown in FIG. 2) that falls along or makes up the home-network coverage area border 310. The roaming border sectors 312 are only distinguishable from cell sectors 308 by the location of their service area and by a system-parameters message that is broadcast therefrom, as will be described in detail below. In another embodiment, cell sites 304 are designated as roaming border sites such that each of the one or more cell sectors at each cell site 304 is designated as a roaming border cell sector 312.

One or more coverage gaps 314 are found within the home-network coverage area 306. A coverage gap 314 indicates an area within the home-network coverage area 306 in which a home-network signal is not available. The signal availability may be dynamic in that the signal may be available at some times and not at others due to factors such as for example and not limitation, weather conditions, other environmental conditions, home-network usage conditions, or a combination of such factors. Alternatively, a coverage gap 314 may be more permanent where, for example the gap is a result of a physical feature such as a mountain or building blocking a home network's signal or where the coverage gap 314 is out of range of all available home-network cell sites 302 and 304.

One or more cell sectors 316 have service areas that border one or more coverage gaps 314. Such cell sectors 316 are not designated as roaming border cell sectors 312, because they are not located along the home-network coverage area border 310 and a home-network provider does not wish to enable roaming within the service area of the cell sector 316. In an embodiment, one or more cell sectors 316 are designated as roaming border sectors.

Figure 3B:
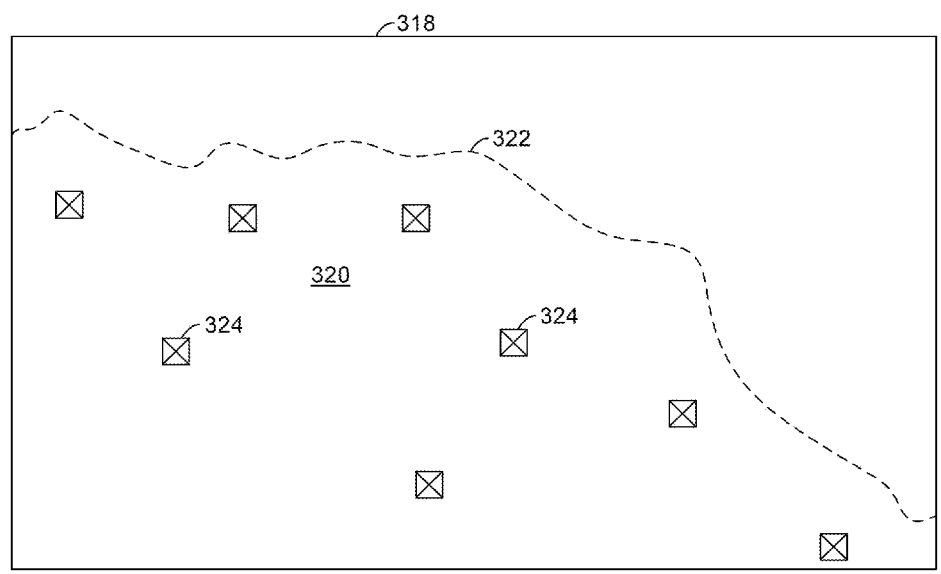
FIG. 3B is a graphical representation of a map depicting a roaming-network coverage area of a wireless-network communications system according to an embodiment of the invention.

With additional reference to FIG. 3B, a graphical representation of a map 318 depicting a roaming-network coverage area 320 of a wireless-network communications system according to an embodiment of the invention. The roaming-network coverage area map 318 depicts the same geographic location as the home-network coverage area map 300 described above. The roaming-network coverage map 318 includes a roaming-network coverage area 320 delineated by a roaming-network coverage area border 322. A number of roaming-network cell sites 324 are located within the roaming-network coverage area 320. The roaming-network generally, and the roaming-network cell sites 320 utilize and comprise any wireless-communications technologies, antennas, configurations, or other characteristics as described above for the home network. Further, a single roaming network is described herein for sake of clarity, but there may be more than one roaming network providing service to the geographic region depicted in FIGS. 3A and B.

Figure 3C:
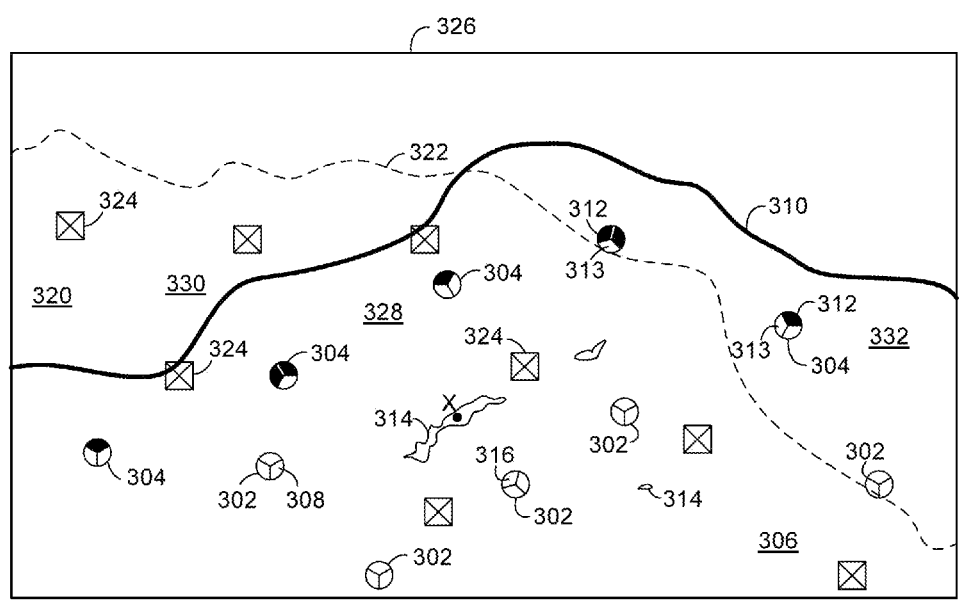
FIG. 3C is a graphical representation of a map depicting both a home-network coverage area and a roaming-network coverage area of wireless-network communications systems according to an embodiment of the invention.

With additional reference to FIG. 3C, an illustration of a combined coverage area map 326 is described according to an embodiment of the invention. The combined coverage map 326 overlays FIG. 3A on FIG. 3B to illustrate the overlap and interaction of the home-network coverage area 306 and its components with that of the roaming-network coverage area 320 and its associated components. As shown in FIG. 3C, an overlapping area 328 occurs where both the home network and the roaming network provide service and a roaming-network only area 330 and a home-network only area 332 occur where the networks do not overlap.

Figure 4:
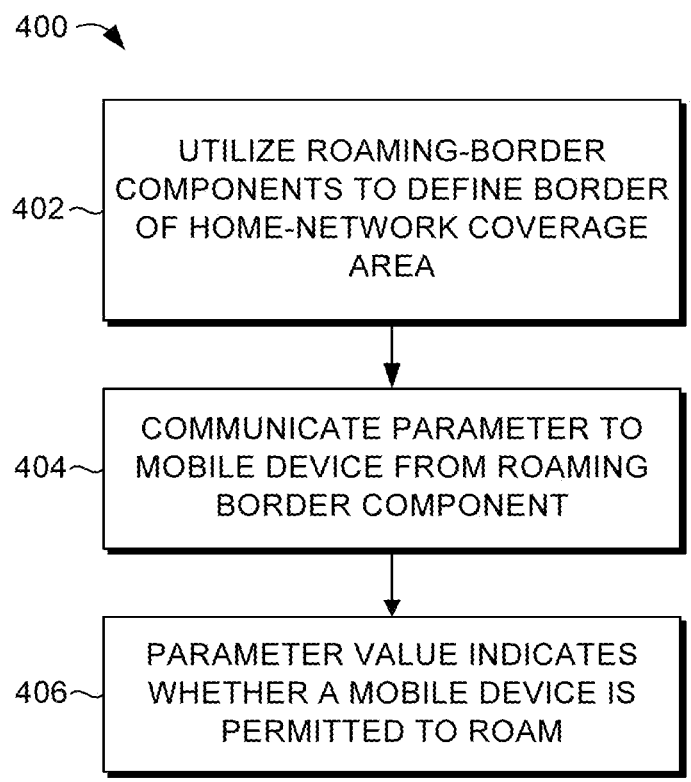
FIG. 4 is a flow diagram depicting a method to enable a wireless-telecommunications network to control a way that a mobile device selectively initiates communications with one of a home network versus a second network according to an embodiment of the invention.

Referring now to FIG. 4, a flow diagram depicting a method 400 to enable a wireless-telecommunications network to control a way that a mobile device selectively initiates communications with one of a home network versus a second network is described according to an embodiment of the invention. At 402, one or more home-network cell sites along the boundary of a home-network (such as home-network cell sites 304) or roaming-border cell sectors (such as roaming-border cell sectors 312) are used to define the border of a home-network coverage area (such as the home-network coverage area 306). A parameter is communicated to a mobile device from the home-network cell sites or roaming-border cell sectors, at 404. The parameter is received by the mobile device while in an idle mode. In idle mode the mobile device is not in use for voice or data communications, but may maintain a connection or periodically determine if a connection is available with a wireless-communications system. In another embodiment, the mobile device may be in an active mode for voice and/or data communications in which voice and/or data transmissions are actively sent and received.

The communicated parameter takes on a value that is useable by the mobile device to determine whether the mobile device is permitted to connect to a roaming-network cell site as will be described more fully below. In an embodiment, the parameter comprises a control logic flag that can be set/turned on, or un-set/turned off. The parameter might utilize a digital bit to indicate whether the flag is set or un-set. The parameter value is communicated by the home-network system to the mobile device by any available method, such as for example, as a bit in a digital signal, as part of a carrier wave signal, or by another method as described above. In an embodiment, the parameter value is communicated to the mobile device in a system-parameters message. The parameter value may be amended to current system-parameters messages by utilizing available fields or by reformatting the system-parameters message to add additional fields. The system-parameters message is broadcast over a paging channel or over any other available channel or frequency.

As described above, the parameter takes on a value indicating whether the mobile device is permitted to roam, at 406. The parameter takes on a first value when the home-network system from which it is broadcast is a not a roaming-border system, such as a home-network cell site 302. The parameter takes on a second value when the home-network system from which it is broadcast is a roaming-border system, such as a home-network cell site 304 or a roaming border sector 312. As described previously, any home-network cell site may be designated as a roaming-border cell site by a home-network provider. In an alternative embodiment, a mobile device may determine whether a home-network system is a roaming-border system by first receiving identifying information from the home-network system in a system-parameters message such as network identification (NID), a system identification (SID), and a radio frequency (RF) channel. The identifying information may then be compared to stored data that is useable to identify the communicating system.

In an embodiment, the communicated parameter value is stored on the mobile device. The parameter value is stored until a new parameter value is received, at which point the initial parameter value is overwritten with the latter parameter value. A new parameter value is received when a mobile device initiates a new connection to a home-network system. A mobile device may initiate a new connection when the mobile device is initially turned on, when it loses a connection with a wireless-communications network system, or when it declares system loss, among others. A mobile device may declare system loss when the mobile device fails to receive a number of messages from a wireless-communications network system. The home-network system communicates the new parameter value to the mobile device and the previous parameter value is overwritten. The new parameter value may be the same or different from the previous parameter value. In an embodiment, roaming-network systems do not broadcast a parameter value. In another embodiment, roaming-network systems do broadcast a parameter value, but only parameter values communicated from a home-network system are used and/or stored by a mobile device.

A mobile device having stored a first value for the parameter is restricted to use of home-network systems to connect to a wireless-communications network. Thus, when the mobile device loses a connection with a wireless-communications system or declares system loss the mobile device is only authorized to initiate a new connection with a home-network system. If the mobile device detects a signal from a home-network system it may connect thereto, but if no home-network signal is detected then the mobile device is rendered out of service until a home-network system is detected. The mobile device may continually or periodically check for signals from home-network systems to which it may connect. Further, even if the mobile device is able to detect a roaming-network system the mobile device will not initiate a connection thereto. In an embodiment, the mobile device is authorized to connect to any available wireless-communications network system for emergency or "911" calls regardless of the parameter value.

A mobile device having stored a second value for the parameter is enabled to connect to either a home-network system or a roaming-network system. Thus, when the mobile device loses a connection with a wireless-communications system or declares system loss the mobile device detects available wireless-communications network systems and may connect to home-network or roaming-network systems. In an embodiment, the mobile device is provided with a database describing available wireless-communications systems to which the mobile device is authorized to connect, both on the home-network and on one or more roaming-networks. The database may be prioritized such that home-network systems have priority over roaming-network systems. Thus, although the mobile device in enabled to connect to a roaming-network system, if a home-network system is detected the mobile device will preferentially connect to the home-network system. The mobile device will only connect to a roaming-network system when no home-network system is detected.

In an embodiment, the database is a preferred roaming list. A preferred roaming list includes a prioritized listing of NIDs, SIDs, and RF channels on which various home-network and roaming-network systems operate, among other data items. An NID, SID, and a channel identifier are communicated to the mobile device from a wireless-communications network system on a paging channel and the NID, SID, and channel identifier are compared to the preferred roaming list to determine if the mobile device is authorized to connect to the broadcasting system.

In one embodiment, a mobile device attempting to connect to a wireless-communications system first determines the stored parameter value. If the parameter has the first value, the mobile device then searches for home-network systems only. Conversely, if the parameter has the second value the device searches for home-network and roaming-network systems based on their priority as defined by a preferred roaming list. In another embodiment, the mobile device first searches for available home-network systems and if none are found, the device then checks the stored parameter value to determine whether it is enabled to use roaming-network systems.

Figure 5:
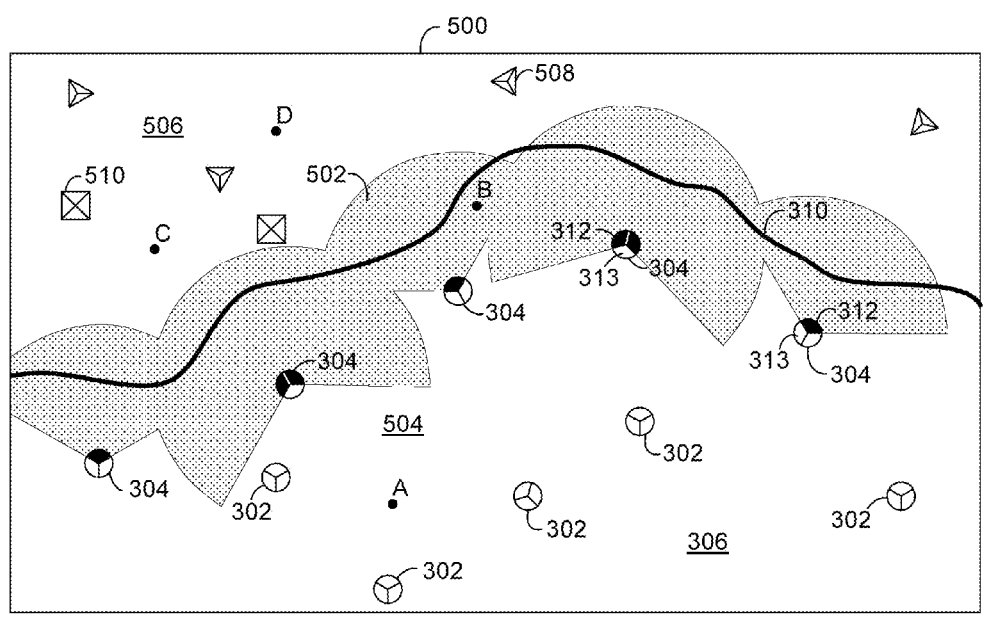
FIG. 5 is a graphical representation of a map depicting a roaming-enabled zone along a border of a home-network coverage area of a wireless-network communications system according to an embodiment of the invention.

With additional reference to FIG. 5 a graphical representation of a map 500 depicts a roaming-enabled zone 502 along a border of a home-network coverage area 306 of a wireless-network communications system according to an embodiment of the invention. The roaming-enabled zone 502 generally depicts the service areas of a number of roaming border sectors 312. In an embodiment, the roaming-enabled zone 502 depicts the service area of a number of home-network cell sites 304. As such, a mobile device located within the roaming-enabled zone 502 attempting to initiate a new connection with a home-network cell site 304 will receive a second parameter value communicated from a roaming border sector 312 thereby enabling roaming of the mobile device. The map 500 also depicts a roaming-restricted zone 504 and a roaming zone 506. A mobile device within the roaming-restricted zone 504 will receive a first parameter value from home-network cell sites 302 and from cell sectors 313 of home-network cells sites 304 that are not designated as roaming border sectors 312. Conversely, a mobile device in the roaming zone 506 will only detect one or more roaming-network cell sites 508 or 510 and will not receive a parameter value therefrom. In an embodiment, a mobile device might receive a parameter value from a roaming-network cell site 508 or 510, but such a parameter value is discarded.

For example, assume a user is initially located within the roaming-restricted zone 504, such as at point A. A first parameter value is communicated to and stored on the user's mobile device. Thus, the user's mobile device is restricted to use of a home-network and can not roam. If the user moves into the roaming-enabled zone 502, such as near point B, and the user's mobile device loses connection with a home-network cell site 302, the mobile device will attempt to initiate a new connection. The first parameter value is still stored on the mobile device, thus the mobile device can only connect to a home-network system, such as a home-network system 304 that serves the area of the roaming-enabled zone 502. Upon detecting a signal from a home-network cell site 304 or a roaming border sector 312 thereof, the second parameter value is communicated to the mobile device in a system-parameters message along with the NID, SID, and a channel identifier, among other information. The second parameter value is stored on the mobile device and overwrites the previously stored first parameter value.

As such, the mobile device is connected to a home-network cell site 304 via a roaming border sector 312 and has a second parameter value stored in memory. If the user then moves into the roaming zone 506, such as to points C or D, or declares system loss while remaining in the roaming-enabled zone 502 the mobile device can connect to either a home-network system, such as the home-network cell sites 302 and 304, or a roaming-network system, such as the roaming-network cell sites 508 or 510. When initiating a new connection the mobile device will follow the prioritized listing of home and roaming-network systems provided in the preferred roaming list. Therefore, the mobile device will preferentially connect to an available home-network system over a roaming-network system. If no home-network system is available, such as within the roaming zone 506 the mobile device will connect to a roaming-network system if one is available.

While within the roaming zone 506 the mobile device will not receive a parameter value, because the parameter value is only communicated via a home-network system. Thus, the second parameter value is maintained in the mobile device's memory. Further, while in the roaming-enabled zone 502 the mobile device will only receive the second parameter value from the home-network cell sites 304 servicing that area, and thus the second parameter value will be maintained in the mobile device's memory. Therefore, while in either the roaming zone 506 or the roaming-enabled zone 502, roaming is enabled for the mobile device.

Once the mobile device re-enters the roaming-restricted zone 504 and initiates communication with a home-network cell site 302 the first parameter value is communicated to the mobile device and the second parameter value is overwritten with the first parameter value. In order for the mobile device to again be enabled to roam it must connect to a home-network cell site 304 and the second parameter value must be communicated to the mobile device and stored in memory prior to initiating a connection to a roaming-network system. In another embodiment, an override logic is provide for a mobile device that is initially powered on within the roaming zone 506 and has the first parameter value stored in memory, such that roaming may be enabled for the mobile device.

Returning to FIG. 3C, assume a mobile device located at point X is located within a coverage gap 314 and therefore loses connection to a home-network cell site 302 or 304. Within the coverage gap 314 the mobile device is unable to detect or connect to a home network system. Further, the mobile device is restricted to use only home-network systems because the first parameter value is stored on the mobile device. Thus, the mobile device is rendered out of service while located within the coverage gap 314. Such is true even though the location of point X is within the service area of one or more roaming-network cell sites 324. A home-network provider might designate a cell sector 316 of a home-network cell site 302 or 304 located in close proximity to the coverage gap 314 as a roaming border sector in order to enable roaming in such a location if such is desired.

A home-network provider may not wish to enable roaming in cell sectors 316 around a coverage gap 314, because the loss of service at the coverage gap 314 may be very brief or may not affect a significant portion of subscribers, among other reasons. For example, if the coverage gap 314 were in an area that was not heavily traveled by subscribers, such as a mountain top, or an industrial site then it may not be cost effective to enable roaming throughout the entire service area of the cell sector 316 in order to provide coverage (roaming coverage) within the coverage gap 314. Conversely, the coverage gap 314 may lie in a heavily traveled area such as around an interstate. In such a location a user may be only briefly out of service and may never become aware that service was lost due to the very short time that they were within the coverage gap 314. Thus, again a home-network provider may not wish to enable roaming throughout the entire service area of a cell sector 316 to provide coverage (roaming coverage) to the area of the coverage gap 314.

Figure 6:
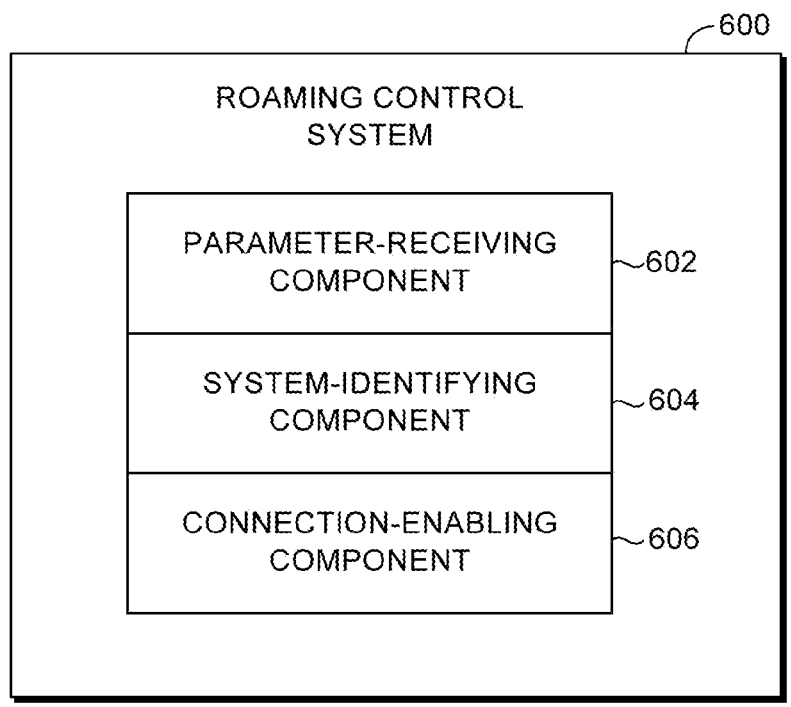
FIG. 6 is a block diagram depicting a roaming control system for controlling a way that a mobile device selectively initiates communications with one of a home network versus a second network according to an embodiment of the invention.

Referring now to FIG. 6 a block diagram depicting a roaming control system 600 for controlling a way that a mobile device selectively initiates communications with one of a home network versus a second network is described according to an embodiment of the invention. The roaming control system 600 includes a parameter-receiving component 602, a system-identifying component 604, and a connection-enabling component 606. The parameter receiving component 602 is configured to receive a parameter value from a wireless communications network system, such as a home-network system or a home-network cell site 302 or 304. The parameter takes on a first value indicating that a mobile device is not permitted to roam on a roaming network, or the parameter takes on a second value indicating that the mobile device is permitted to roam on a roaming network. In an embodiment, the first value is received from a non-roaming border system and the second parameter value is received from a roaming border system, as described previously. The mobile device may also store the parameter value in memory and such storage overwrites any previously stored parameter value.

The system-identifying component 604 receives identification data from a home network and roaming networks. In an embodiment, the identification data includes an SID, an NID, and an RF channel, among other data transmitted by the home and roaming networks. In another embodiment, the data is received on a paging channel. The system-identifying component 604 compares the received identification data to known identification data to identify the communicating home-network or roaming-network system. The known identification data may be stored in a database and may identify home-network and roaming-network systems to which the mobile device is authorized to connect. Further, the known identification data might also prioritize the home and roaming-network systems by an order in which a mobile device is to attempt to connect thereto.

Upon attempting to initiate a connection to a wireless-communications system the connection-enabling component 606 is configure to prevent the mobile device from communicating with a roaming network when the first parameter value has been received and to enable communication with a roaming network when the second parameter value has been received.

In an embodiment, the connection-enabling component 606 identifies a parameter value stored in memory. The connection-enabling component 606 also enables the mobile device to connect to a roaming network when the second parameter value is stored in memory. Conversely, the connection-enabling component 606 prevents a connection to a roaming-network system when the first parameter value is stored. In another embodiment, a mobile device is always enabled to connect to a home-network system without interaction or authorization by the connection-enabling component 606.

Figure 7:
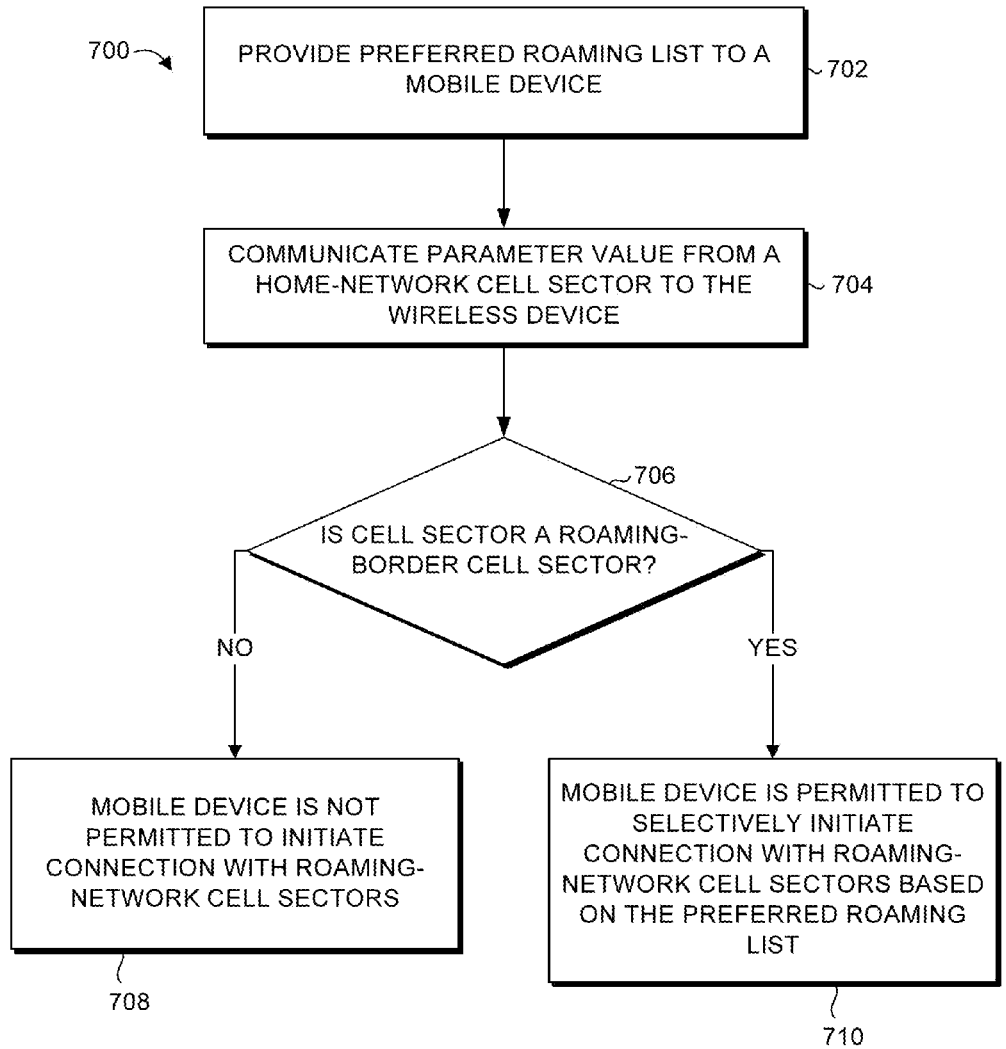
FIG. 7 is a flow diagram depicting a method to enable a wireless-telecommunications network to perform a method of controlling a way that a mobile device selectively initiates communications with one of a home network versus a second network according to an embodiment of the invention.

With reference now to FIG. 7, a flow diagram depicting a method 700 to enable a wireless-telecommunications network to perform a method of controlling a way that a mobile device selectively initiates communications with one of a home network versus a second network is described according to an embodiment of the invention. Initially, a preferred roaming list is provided to a mobile device, at 702. The preferred roaming list includes prioritized list of a number of home-network cell sectors (such as the roaming-border sectors 312 and cell sectors 308) as well as a number of roaming-network sectors or cell sites (such as the roaming-network cell site 324) that a mobile device is authorized to use. The preferred roaming also includes NIDs, SIDs, and channels for each of the cell sites or sectors. The preferred roaming list may be provided to the mobile device only once, such as upon initiation of a service subscription for the device or may be continuously or periodically updated. At 704, a parameter value is communicated in a system-parameters message from a home-network cell sector, such as a cell sector 308 or a roaming border sector 312, to the mobile device. As described above, the parameter has a first value when the communicating cell sector is a non-roaming border sector, such as a cell sector 308, and has a second value when the communicating cell sector is a roaming-border sector, such as a roaming-border sector 312.

At 706, the flow diagram diverges into two paths based on whether the parameter value was communicated from a non-roaming border sector or a roaming-border sector (e.g. has a first or second value). In an embodiment, the parameter value is stored in memory on the mobile device or the parameter value might be stored remotely in a memory structure not contained within the mobile device. The stored parameter value overwrites any previously stored parameter value. At 708, a mobile device has received a first parameter value and is restricted to use of home-network cell sectors. At 710, a mobile device, having received the second parameter value, is enabled to use either home or roaming-network cell sectors. As such, the mobile device selectively initiates communication with a home or roaming-network cell sector based on a priority given to the sectors in the preferred roaming list.

In another embodiment, two separate parameters, a voice parameter and a data parameter, each taking on one of two values are communicated from a home-network system to a mobile device. The voice parameter takes on either a first or a second value and is used to control roaming of the mobile device for voice communications. The data parameter also takes on either a first or a second value and is used to control roaming of the mobile device for data communications. As described above, the voice and data parameters have a first value when the parameters are communicated from a non-roaming border system and a second value when communicated from a roaming border system.

Thus, for example, where a network provider finds it desirable to enable roaming for voice communications in an area, but not data communications such might be achieved by designating cell sectors as roaming border sectors for voice communications. As such, the designated cell sector would communicate a second value for the voice parameter (enabling roaming for voice communications) and a first value for the data parameter (restricting roaming for data communications), among other variations.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. One or more non-transitory computer-readable media, having computer-executable instructions embodied thereon that, when executed, enable a wireless-telecommunications network to perform a method of controlling a way that a mobile device selectively initiates communications with one of a home network versus one or more second networks, the method comprising:

providing a preferred roaming list comprising a prioritized list of,
- (1) on the home network, a plurality of non-roaming-border cell sectors and roaming-border cell sectors, and
- (2) a plurality of cell sectors on the one or more second networks that the mobile device is authorized to utilize;

utilizing the non-roaming-border cell sectors to communicate a first parameter value in a first system-parameters message to the mobile device, wherein the first parameter value indicates that the mobile device is not permitted to initiate a first connection with a first set of the one or more second networks; and utilizing the roaming-border cell sectors to communicate a second parameter value in a second system-parameters message to the mobile device, wherein the second parameter value indicates that the mobile device is permitted to initiate a second connection with a second set of the one or more second networks, whereby said mobile device is enabled to selectively initiate a connection based on said preferred roaming list.

2. The computer-readable media of claim 1, wherein when the mobile device attempts to connect to the wireless-communications network, the mobile device determines a stored parameter value, the stored parameter value comprising either the first parameter value or the second parameter value.

3. The computer-readable media of claim 2, wherein when the stored parameter value comprises the first parameter value, the mobile device searches for the home network system only.

4. The computer-readable media of claim 2, wherein when the stored parameter value comprises the second parameter value, the mobile device searches for the home-network and the second set of the one or more second networks that the mobile device is authorized to utilize based on the preferred roaming list.

5. The computer-readable media of claim 1, wherein when the mobile device attempts to connect to the wireless-communications network, the mobile device first searches for the home network.

6. The computer-readable media of claim 5, wherein when the mobile device is unable to locate the home network:
- accessing a stored parameter value, the stored parameter value comprising the first parameter value or the second parameter value; and
- determining whether the mobile device is permitted to access the second set of the one or more second networks,
- wherein when the stored parameter value comprises the first parameter value, the mobile device is not permitted to initiate the first connection with the first set of the one or more second networks, and
- wherein when the stored parameter value comprises the second parameter value, the mobile device is permitted to initiate the second connection with the second set of the one or more second networks.

7. The computer-readable media of claim 6, wherein when the stored parameter value comprises the second parameter value, the mobile device selectively initiates the second connection with the second set of the one or more second networks based on the preferred roaming list.

8. The computer-readable media of claim 1, wherein the preferred roaming list indicates the home network is prioritized over the second set of the one or more second networks that the mobile device is authorized to utilize.

9. The computer-readable media of claim 8, wherein the mobile device selectively initiates a home network connection with the home network even though the mobile device is permitted to initiate the second connection with the second set of the one or more second networks.

10. The computer-readable media of claim 1:
wherein the mobile device determines a voice parameter value that is stored
the voice parameter value having a first voice-parameter value that indicates that said mobile device is not permitted to roam on the first set of the one or more second networks for voice communications, or a second voice parameter value that indicates that the mobile device is permitted to roam on the second set of the one or more second networks for voice communications.

11. The computer-readable media of claim 1:
wherein the mobile device determines a data parameter value that is stored,
the data parameter having a first data-parameter value that indicates that the mobile device is not permitted to roam on the first set of the one or more second networks for data communications, or a second-data-parameter value that indicates that the mobile device is permitted to roam on the second set of the one or more second networks for data communications.

12. The computer-readable media of claim 1, wherein the roaming-border cell sectors are distinguished from the non-roaming-border cell sectors by a location of a respective service area and by a respective value of the first parameter value and the second parameter value communicated.

13. The computer-readable media of claim 12, wherein the first or the second system-parameters message is broadcasted on a paging channel.

14. One or more nontransitory computer-readable media having computer-executable instructions embodied thereon that, when executed, enable a wireless-telecommunications network to perform a method of controlling a way that a mobile device selectively initiates communications with one of a home network versus a second network, the method comprising:
utilizing a plurality of roaming-border components to define a border of the home network to which the mobile device is subscribed, each of the roaming-border components providing signal coverage that collectively defines the border of the home network; and
selectively communicating one of:
- (1) from a roaming-border component of the plurality of roaming-border components to the mobile device, a parameter having a first value indicating that the mobile device is authorized to roam to the network that is available to which the mobile device is not subscribed; and
- (2) from a non-roaming border component of the home network, the parameter having a second value indicating that the mobile device is not authorized to roam to the second network that is available even though the second network is permitted to provide roaming service to the mobile device,
wherein the plurality of roaming-border components are one or more of a component of a cell sector and a cell tower, and
wherein the plurality of roaming-border components are distinguished from the non-roaming border component by a location of a respective service area and by a respective value of the parameter communicated.

15. The computer-readable media of claim 14, wherein said roaming-border component and said non-roaming border component broadcast a system-parameters message on a paging channel, and wherein the system-parameters message includes the parameter.

16. A system for controlling a way that a mobile device selectively initiates communications with one of a home network versus a second network, the system comprising:
- a parameter-receiving component configured to receive a parameter value from the home-network, wherein the parameter takes on a first value that indicates that the mobile device is not permitted to roam on the second network or a second value that indicates that the mobile device is permitted to roam on the second network;
- a system-identifying component configured to receive identification data communicated from the home network and the second network, and configured to compare the received identification data to known identification data to identify either the home network or the second network, the known identification data prioritizing the home network and the second network by an order in which the mobile device is to attempt to connect to the home network and/or the second network, the second network being one of one or more roaming-networks; and
- a connection-enabling component configured to prevent communicating with the second network when the first parameter value is received and to enable communicating with the second network when the second parameter value is received,
- wherein the first parameter value is received from non-roaming border components and the second parameter value is received from roaming-border components that collectively define a border of the home network.

17. The system of claim 16, wherein the home network that is a home-network-roaming-border system is identified based on the comparison of the received identification data to the known identification data.

18. The system of claim 16, wherein the received identification data comprises one or more of: network identification (NID), a system identification (SID), and a radio frequency (RF) channel.

* * * * *